1,863,542

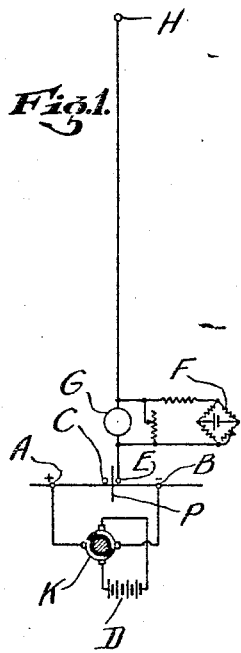
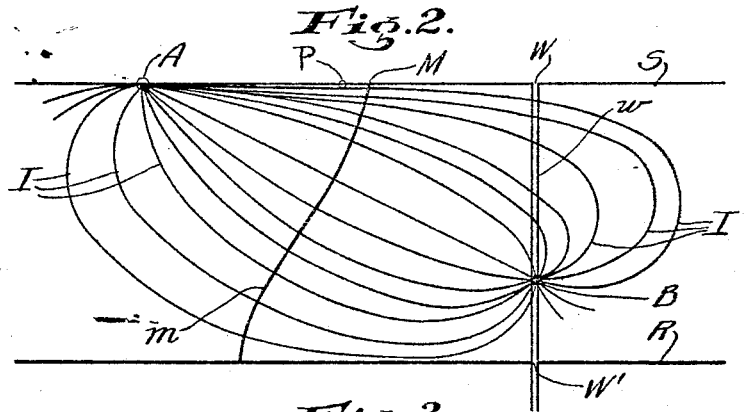
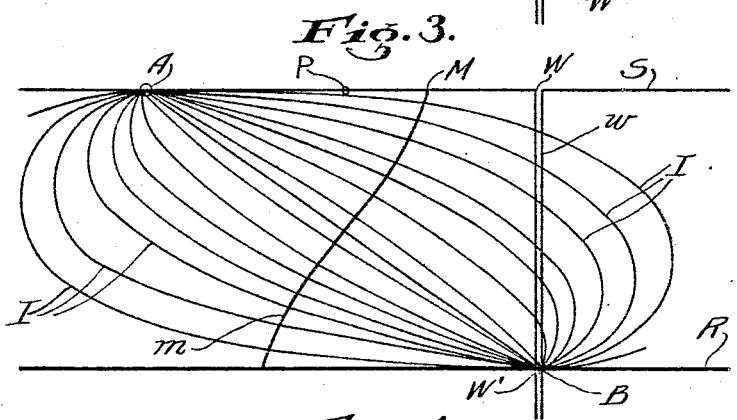
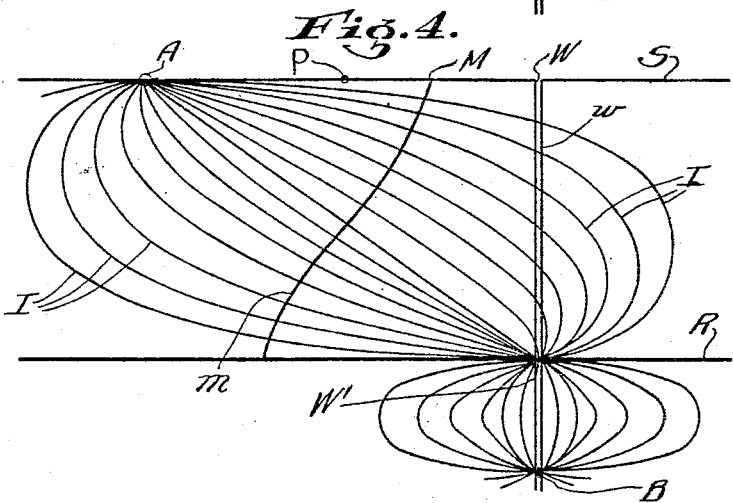

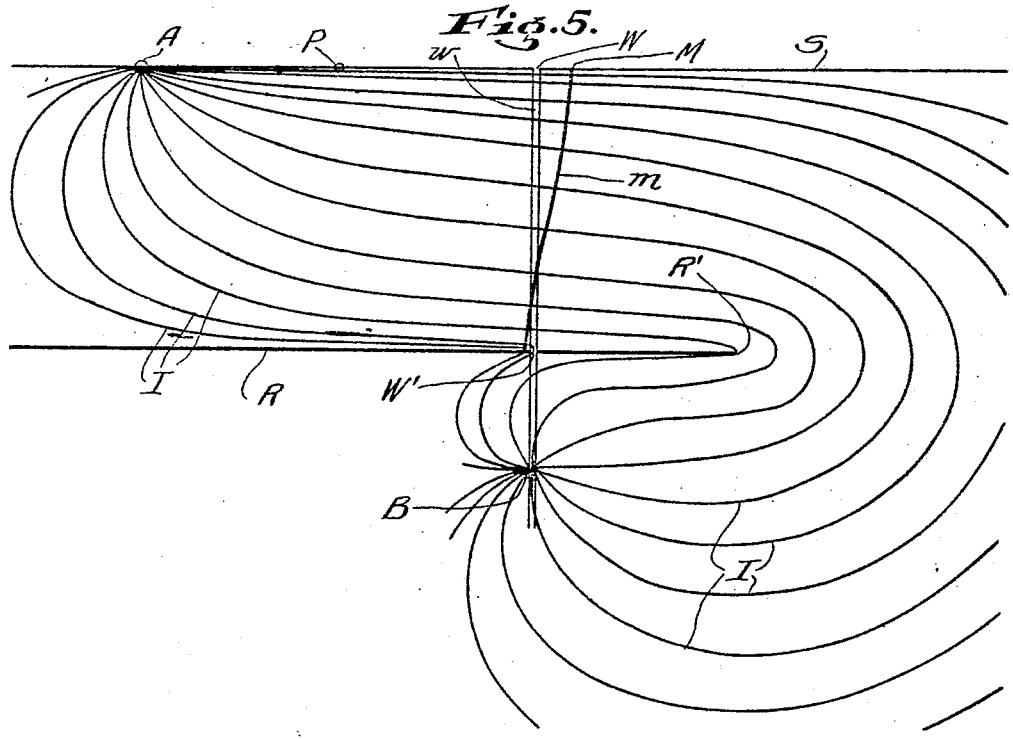
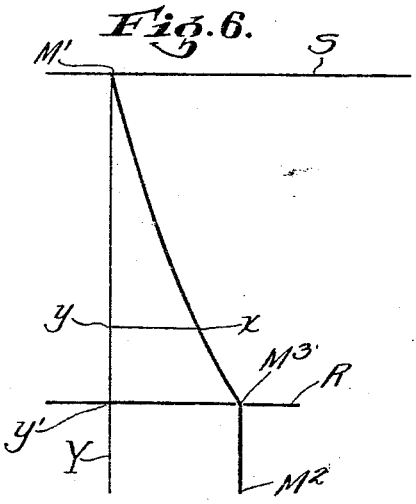
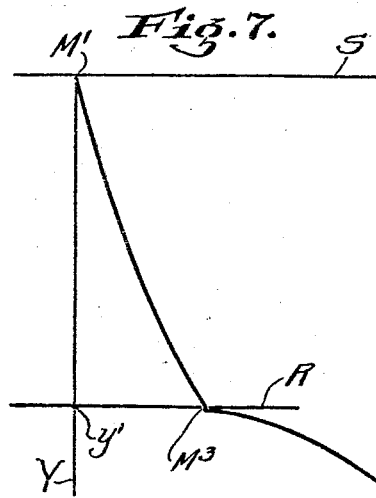
INVENTORS
CHARLES R. NICHOLS
and SAMUEL H. WILLISTON
BY John E. Hubbell
ATTORNEY June 14, 1932. C. R. NICHOLS ET AL 1,863,542
ELECTRICAL PROSPECTING
Original Filed Feb. 10, 1930    3 Sheets-Sheet 3
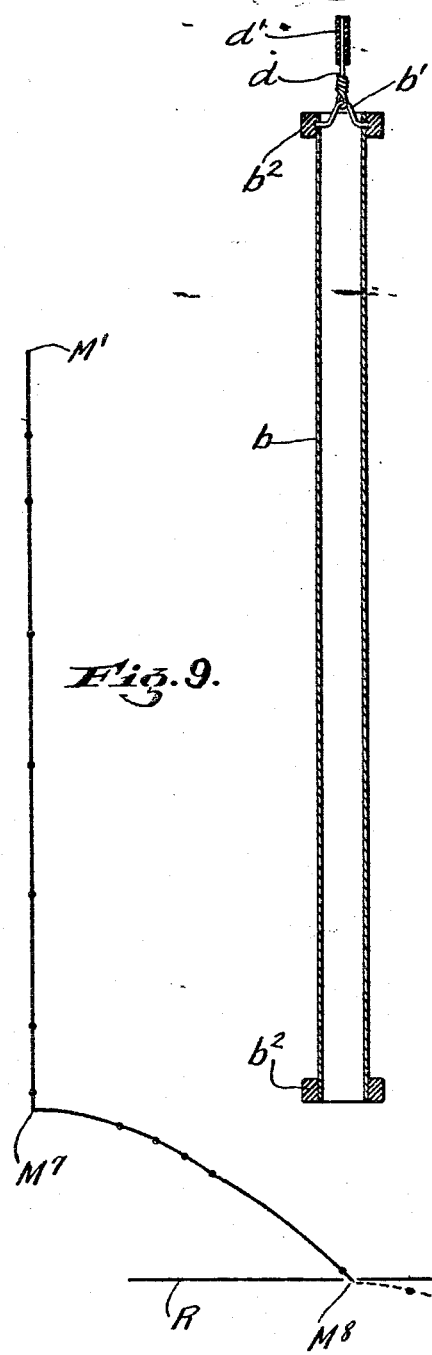
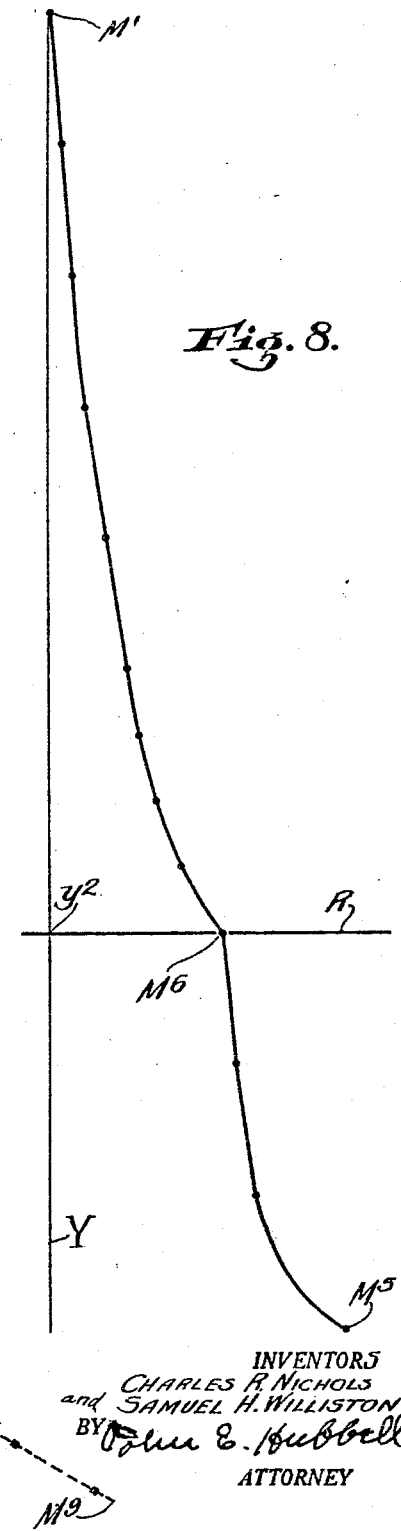
INVENTORS
CHARLES R. NICHOLS
and SAMUEL H. WILLISTON
BY John E. Hubbell
ATTORNEY Patented June 14, 1932

UNITED STATES PATENT OFFICE

CHARLES R. NICHOLS AND SAMUEL H. WILLISTON, OF DALLAS, TEXAS

ELECTRICAL PROSPECTING

Application filed February 10, 1930, Serial No. 427,094. Renewed November 12, 1931.

The general object of the present invention is to provide a simple and effective method for determining the depth beneath the earth's surface of an earth layer or body of resistivity different from that of the adjacent earth material. In carrying out the present invention, we create an electric current flow between an energization point or points on the earth's surface and an energization point located at a variable distance beneath the earth's surface, so as to thereby impress an identifiable potential condition or characteristic on an earth surface point, the position of which is significantly varied by said earth layer or body as the energization point beneath the earth's surface is shifted to vary the vertical distance between it and said layer or body. Except in respect to the energization point located at a variable distance below the earth, the earth energization system employed in carrying out the present invention may be of any of the forms disclosed in our Patent 1,841,376, granted January 19, 1932, on our copending application Serial No. 303,542, filed September 1, 1928. In practice, however, we prefer to employ a two point energization system rather than one in which more than two energization points are employed.

While the invention is adapted for other uses, it is of especial utility in locating oil impregnated sand or rock layers which may have been penetrated by a well or bore hole without being located by coring or other operations, or which may lie beneath the bottom of such a well or bore hole.

When, as may sometimes occur, one lateral edge of the body of anomalous resistivity is relatively close to, and its opposite lateral edge is relatively remote from the well or bore hole, it is possible by the method herein described, not only to determine the approximate depth of said body, but also to obtain significant information concerning the approximate lateral distance of the well or bore hole from the adjacent edge of said body.

The various features of novelty which characterize our invention are pointed out with particularity in the claims annexed to and forming a part of this specification. For a better understanding of the invention, however, its advantages and particular objects attained with its use, reference should be had to the accompanying drawings and descriptive matter in which we have illustrated and described principles utilized in, and preferred modes of practicing, the invention.

Of the drawings:—

Fig. 1 is a diagrammatic representation of apparatus which may be used in the practice of the present invention;

Fig. 2 is a vertical section of an earth portion to be investigated with lines thereon indicating certain current distribution and potential characteristics;

Figs. 3 and 4 are views similar to Fig. 2, illustrating changes in current distribution and potential characteristics produced by varying the depth of the subsurface energization point;

Fig. 5 is a view similar to Fig. 4 illustrating effects on current distribution and potential characteristics of a subsurface body of high resistivity having one lateral edge relatively near to the subsurface energization point;

Fig. 6 is a diagram illustrating the displacements of a potential center point on the earth's surface produced by vertical adjustments of the subsurface energization point in an earth portion of the character represented in Figs. 2, 3 and 4;

Fig. 7 is a diagram similar in character to that shown in Fig. 6, and illustrating the change in potential center displacement at different depths of the subsurface energization point in an earth portion of the character illustrated in Fig. 5;

Fig. 8 is a diagram similar in character to that of Figs. 6 and 7 illustrating the modifying effect on potential center displacements of a conducting well casing extending to a depth substantially beneath the subsurface energization point;

Fig. 9 is a diagram similar in character to Fig. 8 illustrating the potential center displacements produced when the conducting well casing terminates at a depth somewhat less than that at which the high resistant earth layer or body is located; and Fig. 10 is a sectional elevation of a subsurface electrode.

For the practice of the present invention, the field energization and potential center locating provisions of the character illustrated diagrammatically in Fig. 1, are well adapted.

In Fig. 1, A and B represent earth points of energization connected to a source of current D shown as a battery, but which is ordinarily a direct current dynamo, and E represents an exploring electrode connected to one terminal of a detector circuit including a galvanometer G, and having its other terminal connected to a reference potential electrode H in contact with the earth at a reference point so remote from the points A and B, that its potential is not significantly affected by the current flow between the points A and B produced by the source of current D.

In a preferred use of the apparatus shown in Fig. 1 for the practice of the present invention, one of the energization points, for example the energization point A, is located at the surface of the earth, and the other energization point B is located first at one, and then at another distance below the surface of the earth. For example, as shown in Figs. 2 to 5, the energization point A is located at the surface S of the earth, at a suitable distance from the top W of a well or bore hole $w$ extending vertically downward into the earth and in which an energizing electrode constituting or defining the energization point B is suspended. With a suitable current flow established between the energization points A and B, the exploring electrode E is moved along the line A—W to locate the point M at which no potential change is created by the artificial earth energization current flow between the energization points A and B. The point M so located is what we call the potential center or zero potential point on the line A—W. As indicated in the diagrammatic Figs. 2 to 5 inclusive, the point M is the point of intersection of the line A—W with a line $m$. The latter is the line of intersection of the zero potential surface between the energization points A and B with the plane including the vertical well $w$ and the energization point A. The line $m$ is perpendicular at all points along its length to the direction of flow across it of the electric current passing between the energization points A and B. In Figs. 2 to 5, the lines I represent lines of current flow between the energization points A and B.

The diagrammatic Figs. 2, 3 and 4 are based upon the assumptions that the earth's surface S above the exploration field is flat, and that all the earth material between the surface S and the earth layer R is of uniform conductivity, and that the upper surface of said layer R is parallel to the earth's surface S, and that the layer R is of such high resistivity that it will pass no significant portion of the current flow resulting from the potential difference created between the energization points A and B. With these assumptions, if the energization point B were located on the earth's surface at the point W marking the top of the well $w$, the potential center point M on the line A—W would coincide with the geometric center point P midway between the points A and W. As the energization point B is lowered in the well through the position shown in Fig. 2 into that shown in Fig. 3 in which the energization point is at the level of the upper surface of the layer R, the point M will be progressively displaced along the line A—W in the direction from A toward W. The potential center displacement, i. e. the distance of the point M from the point P, for any given depth of the energization point B, can be computed or predetermined under the conditions assumed above, from the laws governing the flow of electric current between points at different electrical potentials in a large body of uniform conductivity. No necessity exists for stating or explaining those laws as they are, and long have been, well known to physicists.

On the assumption that the layer extends in all directions from the well $w$ to or beyond the limits of the field of effective energization, the movement of the energization point B through the layer R from the position shown in Fig. 3 to that shown in Fig. 4, will not alter the current distribution in the portion of the earth above the layer R illustrated in Fig. 3 which prevails when the energization point B is located at the level of the upper surface of the layer R. The lines of current flow between the energization point B, when in the position shown in Fig. 4, and the portion W' of the well hole $w$ passing through the layer R, first spread out into the earth surrounding the portion of the well $w$ below the layer R, and then converge again, as all of the current, on the assumptions made, must pass through the well or bore hole opening W' in the insulation layer R.

With the assumptions made above as to the conductivity of the earth portions shown in Figs. 2, 3 and 4, the horizontal displacement of the potential center point M resulting from a movement of the energization point B downward from the earth's surface S to any particular depth, is represented by the horizontal distance $y—x$ in the diagrammatic Fig. 6, wherein the depth of the energization point B below the surface of the earth is represented by the distance $M'—y$ measured along the line M'—Y, and the point $x$ is located on the displacement curve $M'—M^3$. In Fig. 6, the horizontal distance $y'—M^3$ represents the variation in potential center displacement produced by moving the energization point B from the earth's surface down to the level of the upper surface of the layer R. The portion M'—M³ of the displacement curve M'—M² curves away from the line M'—Y, since the ratio of potential center displacement to depth of the energization point B, increases as the energization point approaches the layer R. Since on the assumptions made, all of the current must pass through the well or bore hole opening W' in the layer R when the energization point B is below the latter, the portion M³—M² of the displacement curve M'—M² is parallel to the vertical line M'—Y. As those skilled in the art will understand, the movement of the energization point B downward below the layer R tends to diminish the intensity of current flow between the point A and the opening W', but slightly and does not produce any change in relative distribution of current flow between A and W'.

The condition illustrated in Fig. 5 differs from that illustrated in Fig. 4, in consequence of the fact that in Fig. 5 the high resistivity layer R does not extend to the margin of the field of energization in all directions from the well $w$, but has one side edge R' so close to the well $w$ that the major portion of the current flow between the points A and B does not pass through the opening W' in the layer R, when the point B is below the layer R, but bends around the edge R' of the layer R. In consequence, as the energization point B is moved downward through the well or bore hole opening W' to a level below the layer R, the potential center displacement sharply increases, and then continues to increase, but at a progressively diminishing rate as the energization point B is moved to still greater depths. The variation in potential center displacement produced by moving the energization point B to varying depths, with the conditions illustrated in Fig. 5, is graphically shown in Fig. 7. The potential center displacement curve M'—M⁴ of Fig. 7 is formed in the same manner as the potential center displacement curve M'—M² of Fig. 6. The upper portions M'—M³ of the displacement curves of Figs. 6 and 7 are nearly alike, but the lower portions of the two curves are very different. The portion M³—M⁴ of the potential center displacement curve M'—M⁴ of Fig. 7 is not a straight line parallel to the line M'—Y, but is a curve extending away from the point M³ in a direction nearly horizontal, and then bending more and more toward the vertical.

In the practical use of the invention, contact with the earth at the so-called energization "points" A and B can never be made at mathematical points. To minimize the objectionable effect of contact resistance, contact with the earth at the energization point A is ordinarily effected by the use of a multiplicity of metal stakes connected to the corresponding terminal of the current source, and driven into the earth at points distributed over a considerable surface area such as that lying within a circle 50 feet or so in diameter. When contact with the earth at the point A is effected in this manner, no significant practical error is made, however, in assuming that the energization point is located at the center of the area in which contact stakes are driven, especially because of the small dimensions of that area as compared with the distance between the two energization points. For example, we have found that in locating an earth layer of high resistivity, ultimately found at a depth of approximately 1400 feet below the surface of the earth, the distance between the surface energization point A and the mouth W' of the well or bore hole $w$ containing the energization point B, may well be 2000 feet or so.

In field use we have successfully connected one side of the source of current D to the earth at the energization point B by means of an energizing electrode shown in Fig. 10, and comprising a brass tube $b$ three inches or so in diameter, and five feet or so in length. As shown in Fig. 10, the tube $b$ is provided with a bail $b'$ at its upper end to which is electrically and mechanically connected the lower end of a conductor $d$, the body portion of which is enclosed in an insulating jacket $d'$, and which serves the treble function of suspending the tube $b$, electrically connecting the latter to the corresponding terminal of the source of current D, and as a means for measuring the depth below the surface of the earth at which the tube $b$ is located. Where, as may happen, the well or bore hole $w$ in which the energization electrode is suspended is provided with a metal casing tube or lining, we consider it advantageous to prevent direct electrical contact between the electrode tube $b$ and the metallic well casing, and to establish electrical contact between the earth and the metal tube $b$ through the liquid in which the tube $b$ is immersed when, as will ordinarily be the case where conditions make the use of the invention desirable, the well or bore hole is filled with water containing enough salts in solution to make the liquid sufficiently conductive for the purpose. As shown in Fig. 10, rubber washers $b^2$ are mounted on the ends of the tube $b$ to keep the latter out of direct electrical contact with the lining tube.

In the practice of the present invention, the usual expedients known in the art, or heretofore developed by us and disclosed in our prior patents, and notably in our said Patent 1,841,376, may be employed to avoid polarization troubles, to minimize earth contact resistance, to neutralize or compensate for the effect of stray earth currents, and to avoid or minimize other causes and effects tending to create errors in, or uncertainties in, interpreting the observational results obtained. For example, to avoid polarization troubles and to minimize earth contact resistance, the earth at each detector circuit electrode and energization point may be impregnated with a salt solution of the metal forming the electrode or electrode parts there in contact with the earth. To eliminate the effect of stray earth currents in the vicinity of the energization field, provision should be made for interrupting and reversing the current flow between the points A and B so as to permit quickly repeated readings of the galvanometer G under the different conditions. For this purpose, a motor operated reversing switch K is conveniently employed.

The particular form of field energizing and potential center locating system shown in Fig. 1 is illustrated and described in detail in our said Patent 1,841,376, wherein we have explained in some detail the principles governing the location of the remote electrode H. As explained in said application, the exact location of the reference electrode H may be varied widely. It seems sufficient to say herein, however, that if the electrode H is located on a line perpendicular to the line A—W intersecting the latter at a point approximately midway between the points A and W, and if the electrode H is at a distance from the line A—W not less than five times the distance between the point A and B, the electrode H will be outside of the field energized by the current flow between the points A and B to an extent sufficient to prevent any significant potential variation at the point at which the electrode H is located.

With the detector circuit electrodes E and H separated as described, the earth potential of the reference electrode H location will ordinarily be different from that existing at any point on the line A—W, even though no potential difference is impressed upon the energization points A and B, in consequence of natural causes, not generally understood, but giving rise to what are commonly called stray earth currents. The distributing effects of such potential difference, due to natural causes between the points at which the electrodes E and H are located, on the potential comparison to be made in locating the potential center may be eliminated or compensated for, as by adjusting the variable potentiometer F to impress on the terminals of the galvonometer G such a balancing E. M. F. that when the exploring electrode E is located at the zero potential point on the line A—W, the galvanometer will give no significant deflection on an interruption or reversal of the energizing current flow between the points A and B.

In lieu of locating the midpotential point directly by moving the exploring electrode E along the line A—W until it is brought to rest on the midpotential point, the latter may be located indirectly by placing the exploring electrode E at the geometric center point P, and observing the extent and direction of deflections of the galvanometer G, suitably calibrated for the purpose, which occur when current flow between the energization points A and B is established and interrupted.

It is theoretically possible, also, to locate the midpotential point on the line A—W by direct observation of the potential differences created at points along the line A—W, by establishing and interrupting the current flow between the energization points A and B. One method by which this may be accomplished consists in first charging all four quadrants of a quadrant electrometer by connecting them to the earth at the point where the potential condition is to be investigated during a period in which no current is flowing between the points A and B, then disconnecting an opposing pair of electrometer quadrants from the earth, and then creating an energizing current flow between the points A and B, whereupon an electrometer deflection should, or should not, occur accordingly as the point under investigation is not, or is, the midpotential point.

In practice the earth material overlying the body R to be located will never be entirely homogeneous and of uniform conductivity. Usually, also, the earth layer or body R to be located will not be a practically perfect insulator, at least in all portions of its horizontal extent.

In consequence of the practical considerations referred to, the use of the invention in regular field work cannot be expected to give results as precisely defined as those which Figs. 6 and 7 indicate are obtainable with the ideal earth structure conditions assumed in connection with Figs. 2 to 5. Theoretical considerations indicate, however, and field use of the invention has confirmed the indication, that the present invention may be successfully employed in locating any subsurface body, such as the earth layer R of Figs. 2 to 5, which is penetrated by a well or bore hole in which an energizing electrode may be lowered to establish contact with the earth in proximity to, and at varying distances from such subsurface body, where the latter is of considerable horizontal extent and differs substantially in resistivity from the earth material above it. For example, we have succeeded in locating a layer of oil impregnated rock located at a depth of approximately 1400 feet below the surface of the earth and penetrated by a well previously drilled to a considerably greater depth notwithstanding the fact that the well was metal lined to a depth much greater than 1400 feet.

Fig. 8 is a potential center displacement curve made from field observation data obtained in the work referred to in the preceding paragraph. The curve M'—M⁵ shown in Fig. 8 is a potential center displacement curve of the same character as that illustrated in Figs. 6 and 7, and notwitstanding the masking effect of the well casing lining, the curve M'—M⁵ of Fig. 8 clearly indicates a marked change in the ratio of potential center displacement to the subsurface energization point depth at the level of the body of anomalous resistivity. In Fig. 8, the distance $y^2$—M⁶ represents the change in potential center displacement resulting from the movement of the subsurface energization electrode $b$ from the earth's surface down to the oil impregnated rock layer.

The field results illustrated in Fig. 8 were checked by other field observations illustrated in Fig. 9, made after the metallic well casing was raised in the well until the lower end of the casing was located at the level of the point M⁷ of Fig. 9 which was some 1160 feet below the surface of the earth. The effect of eliminating the masking action of the metallic well casing at and for a considerable distance above the oil impregnated rock layer is made strikingly apparent by a comparison of Figs. 8 and 9, especially when account is taken of the fact that while Figs. 8 and 9 are drawn to the same scale in respect to vertical dimensions, insofar as the horizontal dimensions are concerned, the scale of Fig. 8 is five times the scale of Fig. 9.

In Fig. 9 the vertical position of the point M⁸ corresponds to the level of the rock layer of anomalous resistivity. The effect of eliminating the masking action of the metal well casing below the level of the point M⁷, is to make the portion M⁷—M⁹ of the curve of Fig. 9, much more nearly horizontal than is the portion of the curve of Fig. 8 corresponding to the same range of subsurface energization point elevation, but the change in the form of the curve at the point M⁸ is more sharply defined in Fig. 9 than is the change in the form of the curve of Fig. 8 at the same level.

With the scale to which horizontal dimensions are shown in Fig. 9, the portion M'—M⁷ of the curve M'—M⁹ while actually inclined, appears to be vertical. For this reason the line M'—Y is omitted in Fig. 9.

In the practical use of the invention, we have found that there is a notable increase in the precision with which the potential center may be located by adjustment of exploring electrode E, as the midpotential point approaches the position at which it is found when the subsurface energization point B approaches the level of the subsurface layer or body of anomalous resistivity. As those skilled in the art will understand, the potential differences between points on the earth's surface in the vicinity of the midpotential point and separated from one another by short distances are exceedingly minute, and the midpotential point ordinarily cannot be located more precisely than within a certain range varying from less than a foot in some cases up to several feet in others. In the field experiments referred to above, we found that the practical range of error or uncertainty in locating the midpotential point diminished very definitely as the subsurface energization electrode approached closely to the subsurface body of anomalous resistivity in moving upward toward the latter from a lower level. Repeated observations under different conditions have uniformly shown this increase in the precision of definition of the midpotential point location, as the subsurface energization point approaches the level of the subsurface body of anomalous resistivity, and we feel justified in saying that in making field observations of the character referred to, a notable increase in the precision at which the midpotential center point may be located occurring as the subsurface energization electrode approaches a certain level indicates the location at that level of a subsurface body of anomalous resistivity.

The invention herein disclosed is obviously capable of a wide range of use. For example, it has been used in locating the existence of an oil bearing rock layer, the existence and approximate depth of which had been indicated in data previously obtained by the use of the electrical prospecting methods disclosed in our said Patent 1,841,376, but which had not been detected in the subsequent boring of a well which penetrated said layer. A failure to detect such an oil bearing rock or sand layer in a well or bore hole drilling operation may occur from time to time from the omission of suitable or suitably observed coring operations, or because the well may chance to penetrate some local portion of the layer which differs radically in character from the body of said layer. For example, the well may happen to penetrate a body of rock impervious to oil though incorporated in an oil bearing rock layer and of such small extent that an oil producing well may be formed by "shooting", or exploding an explosive charge at the level of the earth layer of anomalous resistivity.

As those skilled in the art will readily understand, the invention is not necessarily limited to use under conditions in which the subsurface energization point is located in a well or bore hole. The invention may be used with advantage in some cases, for example, in which the subsurface energization point is in contact with the earth along the side wall of a deep canyon.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used without a corresponding use of other features.

Having now described our invention, what we claim as new and desire to secure by Letters Patent, is:—

1. The method of electrical prospecting which consists in creating an electrical current flow through the earth between energization points one of which is located at a variable distance below the earth's surface, varying the depth below the earth's surface of the last mentioned energization point, and comparing the effects of said current flow on potential conditions at the earth's surface when said subsurface energization point is at different depths.

2. The method of electrical prospecting which consists in creating a difference in electrical potential between an energization point on the earth's surface and a subsurface energization point, varying the depth below the earth's surface of the last mentioned energization point, and determining the changes resulting from said depth variation in the location of a midpotential point on the earth's surface.

3. The method of determining the distance below the surface of the earth, of a layer of earth material of different resistivity from the adjacent earth material which consists in creating an electric current flow between energization points one of which is located at a variable distance beneath the earth's surface, locating a portion of the earth's surface on which an identifiable potential characteristic is impressed by said current flow, and repeating the operations described with the last mentioned energization point located at different distances from the earth's surface.

4. An electrode adapted to be suspended in a well or bore hole comprising a tubular body of metal, and insulating means carried by said body and adapted to hold the latter out of contact with the wall of a well or bore hole in which said electrode is suspended.

Signed at Dallas, in the county of Dallas and State of Texas, this fourth day of February, A. D. 1930.

CHARLES R. NICHOLS.
SAMUEL H. WILLISTON.